Dec. 16, 1952  R. U. ROURKE  2,621,774
ARTICLE REARRANGING AND TRANSFER APPARATUS
Filed Jan. 29, 1947  3 Sheets-Sheet 1
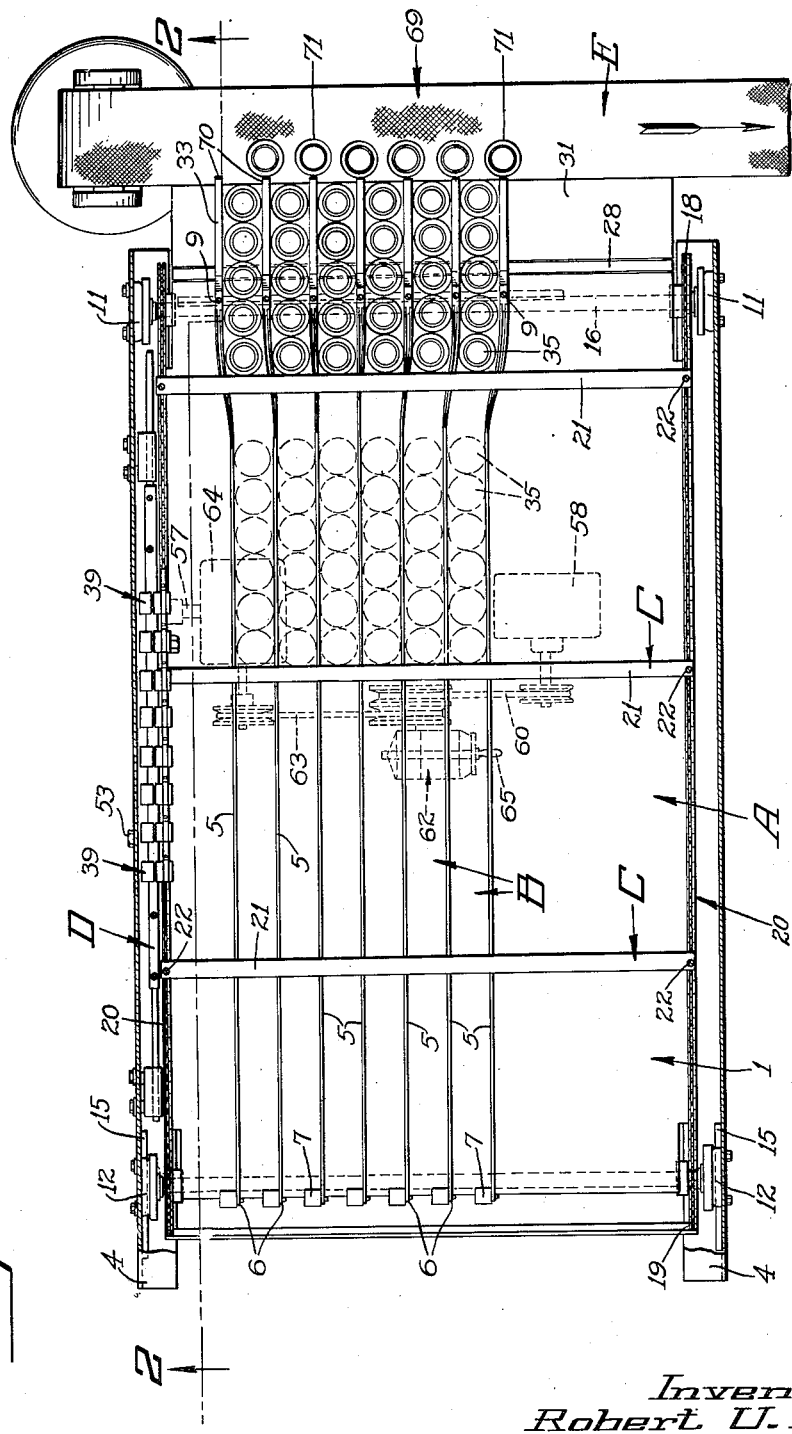
Inventor
Robert U. Rourke
by Parham + Bates
Attorneys

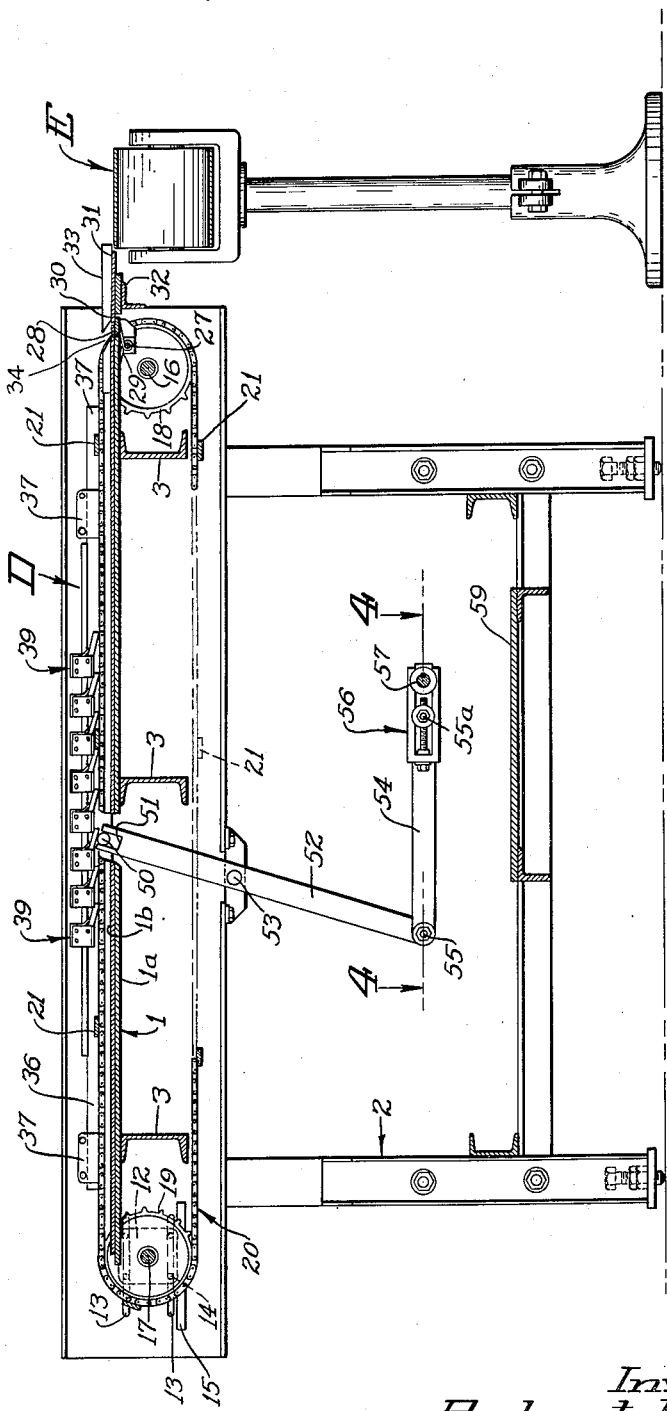

Dec. 16, 1952 R. U. ROURKE 2,621,774
ARTICLE REARRANGING AND TRANSFER APPARATUS
Filed Jan. 29, 1947 3 Sheets-Sheet 3
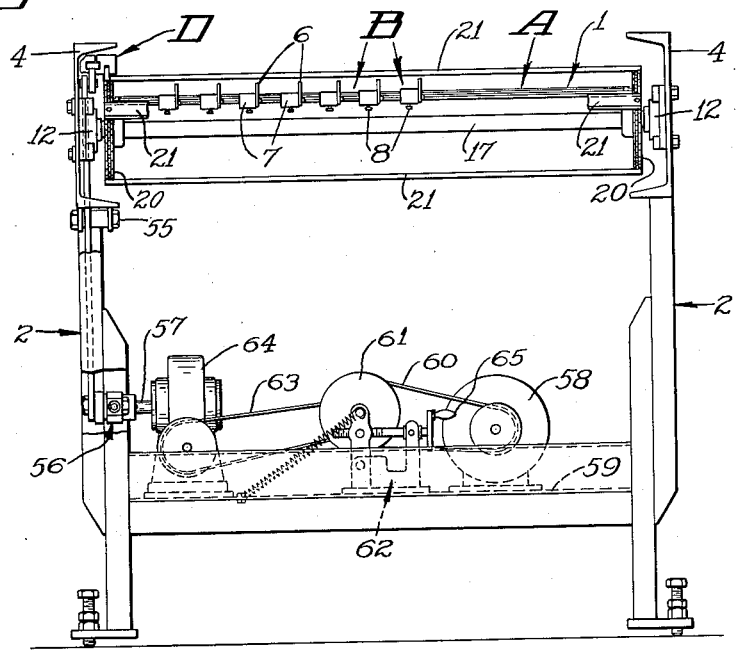
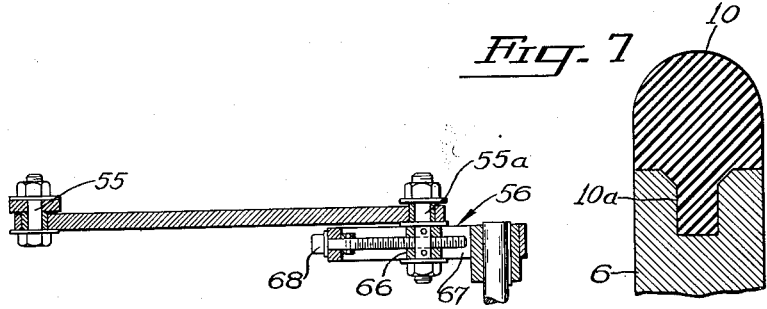
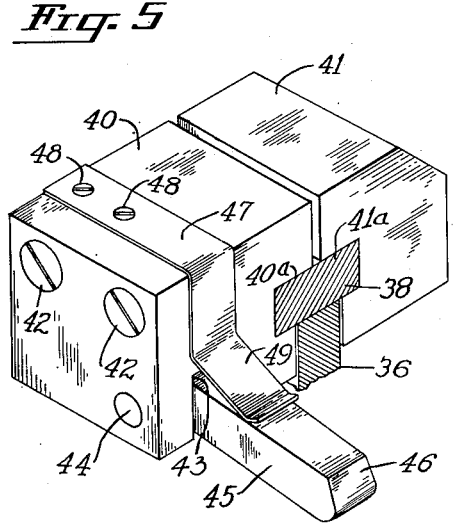
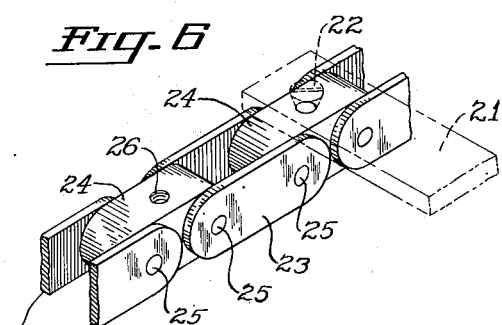
Inventor
Robert U. Rourke
by Parham + Bates
Attorneys Patented Dec. 16, 1952

2,621,774

UNITED STATES PATENT OFFICE 2,621,774

ARTICLE REARRANGING AND TRANSFER APPARATUS

Robert U. Rourke, Pomfret Center, Conn., assignor to Emhart Manufacturing Company, a corporation of Delaware Application January 29, 1947, Serial No. 725,142

7 Claims. (Cl. 198—32)

This invention relates generally to improvements in article handling and transfer devices. The present invention relates more particularly to a device by which a plurality of rows of articles, such as glass containers, may be rearranged in a single row to facilitate handling thereafter by associated equipment.

In the glass container field, a wide variety of equipment is known for handling multiplicities of containers which are to be rearranged in a single row. This equipment is used in particular where containers, previously enclosed in shipping cartons, are to be removed therefrom and rearranged in a row for subsequent handling such as washing, filling, or labeling. One general type of equipment designed for this purpose is intended to receive a multiplicity of promiscuously arranged containers as they are moved along on a conveyor towards some sort of converging chute. Moving guide bars or agitator members may be provided to aid in feeding the containers to the chute and to aid in preventing jamming of adjacent containers at the entrance thereof. This type of device may be satisfactory for handling certain types of containers, principally those that have more-or-less circular cross sections; however, containers of square and other non-circular cross-sections often may tend to jam and break at the entrance of the converging chute, and there may be a tendency to crush adjacent containers when this type of device is employed to rearrange thin-walled containers.

It is an object of the present invention to provide an efficient means for handling articles, such as containers just removed from packing cartons, so as to rearrange the articles in a single row on a moving conveyor, quickly and safely, irrespective of the particular cross-sectional configuration of the articles, which may vary within a wide range.

A further object of the present device is to provide means of the character described which are easily adjusted to handle a multiplicity of sizes and shapes of containers or other articles, including containers having extreme cross-sectional shapes, such as squares and rectangles.

It is also within the purview of the present invention to provide a handling device that may be used to rearrange articles having vertically inclined side walls.

A still further object of the present invention is to provide a device that may impart gradually accelerating and decelerating movements to a plurality of rows of containers so that none of the containers is knocked over, broken, or otherwise damaged.

Another object of the present invention is to provide a container-handling device that may be used to rearrange thin-walled containers, including those having large diameters, without danger of crushing or otherwise damaging the containers.

Additional objects and advantages of the present device will become apparent from or be particularly pointed out in the course of the following description which is made with particular reference to the accompanying drawings, in which:

Fig. 1 is a top plan view of a preferred embodiment of the present invention in juxtaposition to a conventional conveyor unit, the view showing a plurality of rows of containers being advanced intermittently toward the conveyor and a single file of containers being transferred by the conveyor away from the plurality of rows in a direction normal thereto;

Fig. 2 is a longitudinal section view of the preferred device taken on line 2—2 of Fig. 1, showing certain details of a plurality of pawl units incorporated therein and certain details of the driving means thereof;

Fig. 3 is an end elevation view of the device shown in Figs. 1 and 2, showing additional details of the driving means;

Fig. 4 is a horizontal section view showing the details of construction of certain driving members, the view being taken on line 4—4 of Fig. 2;

Fig. 5 is an enlarged perspective view of a pawl unit, a plurality of which are shown in Figs. 1 and 2;

Fig. 6 is an enlarged perspective view of a portion of a link chain of the type used in the present device as a carrier means, an associated pusher member being shown in phantom lines; and Fig. 7 is an enlarged cross-sectional view of a portion of a longitudinal guide rail showing a soft resilient protective member attached thereto.

Generally speaking, the present device comprises a supporting surface A on which a plurality of articles may be placed in rows within adjustable guide-ways, generally designated B, and along which the articles may be moved by a plurality of movable pusher members C which are actuated at predetermined intervals of time by driving means, generally designated D. A conveyor, generally designated E, may be provided at one end of the supporting surface to receive and remove the terminal containers of the rows as they are advanced by the pusher members towards the end of the supporting surface.

Supporting surface A may comprise a horizontal supporting table, generally designated 1, which is suitably maintained in space by a frame structure, generally designated 2. The frame structure may comprise a plurality of channel members 3 to which table 1 may be attached, members 3 being rigidly secured to a pair of longitudinal side channels 4. Table 1 may comprise a base plate 1a upon which a superficial smooth protective layer 1b may be provided to cushion and to prevent marring of the containers placed and transferred thereon.

A plurality of adjacent parallel guide-ways B may be formed along the surface of table 1 by a plurality of spaced, longitudinal guide rails 5 which may be adjustably secured to table 1. These guide rails may comprise long metallic strips each resting on a longitudinal edge along the surface of the support table and may be attached at one end, as at 6, to a mounting block 7 which is secured in an adjusted position along the edge of the latter by a clamp screw 8, as shown in Fig. 3. As shown in Fig. 1, the opposite ends of these guide rails may be curved slightly and may be secured to table 1 by any conventional fastening means, such, for example, as indicated at 9. The lateral spacing between these guide rails may correspond to the spacing of the divider sections within a carton of the type retaining containers which are to be rearranged in single file order by the herein disclosed device. It is to be noted that the adjustment of the lateral spacing of these guide rails is easily made simply by loosening clamp screws 8 and the conventional fastening means 9 which secure the guide rails to the table.

As shown in Fig. 7, a protective strip 10 of rubber or other suitable soft resilient material may be secured to the upper edge of each guide rail 6. This strip protects the containers being guided by the guide rail. The protective strips may be attached to the guide rails in any suitable fashion, a tongue-in-groove type joint, shown at 10a, being used in the present embodiment.

As shown in Figs. 1, 2 and 3, pairs of transversely aligned bearing plates 11 and 12, respectively, may be provided at the right and left-hand ends, respectively, of the device. (Right and left referring to the views shown in Figs. 1 and 2.) As shown in Fig. 2, slots 13 may be provided in channel members 4 at the left-hand end of the device. These slots permit the longitudinal adjustment of position of bearing plates 12. Conventional fastening means 14 may pass through the slots and be engaged with bearing plates 12, thereby facilitating the adjustment hereinbefore referred to. A bar 15 may be secured to each side channel 4 to guide the bearing plates 12 in the course of their longitudinal adjustments. Mounted for rotation between the pairs of bearing plates 11 and 12 are cross shafts 16 and 17, respectively. Secured to and rotatable with shafts 16 and 17 are sprockets 18 and 19, respectively, two sprockets being provided on each cross shaft. Continuous endless link chains (hereinafter called "carrier chains"), generally designated 20, pass over and are engaged with sprockets 18 and 19, one chain being provided at each side of the herein disclosed device as shown in Figs. 1 and 3. By means of the adjustment of bearing plates 12 as hereinbefore described, slack may be removed from the carrier chains.

Pusher members C may comprise a plurality of pusher bars 21 which may be attached to the carrier chains 20 at predetermined intervals by any conventional fastening means 22, the spacing between consecutive pusher bars being uniform for the entire length of the carrier chains. The spacing is a preferred quantity which is related to the size and numbers of containers being handled by the device, as will be described more fully hereinafter. As shown in Fig. 3, pusher bars 21 move with the carrier chains and are suitably disposed and spaced to pass transversely across the top of guide rails 5.

Fig. 6 shows the details of construction of a portion of one of the carrier chains. Pairs of side plates 23 are pivotally secured to blocks 24 by pivot pins 25 in a manner similar to the construction of a conventional roller chain. Each block 24 is provided with a threaded hole 26 which is adapted to receive a conventional fastening means 22 (shown in phantom lines) by which one end of a pusher bar may be secured to the chain.

Supported beneath the lower face of the right-hand end of table 1 is a transverse pivot rod 27 of substantial transverse extent. Pivoted thereon for limited swinging movements is a movable gate or trap door 28. Associated with pivot rod 27 and disposed in operative relationship to table 1 and gate 28 is a torsion spring 29. Spring 29 acts to swing gate 28 in a counterclockwise direction, as viewed in Fig. 2. In its extreme counterclockwise position, a projecting stop 30 of gate 28 bears against a transverse dead plate 31 which will be described presently. Support brackets 32 are rigidly attached to side channels 4 and support the dead plate at a level corresponding to the level of the upper surface of table 1. Thus, the levels of table 1, movable gate 28 and dead plate 31 are such as to present a substantially continuous surface at a constant horizontal level for the movements of containers thereupon. A plurality of spaced guide bars 33 may be adjustably secured to dead plate 31 and may be laterally spaced to register with the longitudinal guide rails, substantially as shown in Fig. 1. A space 34 may be provided between the ends of the guide rails and the guide bars, as shown in Fig. 2, to permit the passage therebetween of each pusher bar in the course of its movements with the carrier chains.

In a general sense, the operation of the mechanism described to this point is as follows: A plurality of containers 35 may be deposited either by rows or individually to form rows in any suitable manner between guide rails 5 so that the containers are standing upright on the upper surface of the support table. As the pusher bars are moved intermittently predetermined distances to the right, the plurality of rows of containers will simultaneously be advanced correspondingly by the associated pusher bars. As each pusher bar comes to the right-hand end of the disclosed device, it is moved downwardly against gate 28. The movable gate will yield downwardly to permit the bar to pass beneath the level of the support table. The pusher bar will move thereafter beneath the level of the supporting table and will eventually return to the upper surface of the table and thus begin a repetition of the intermittent movements along the upper surface thereof. The means for moving the pusher bars intermittently and the details of the variables to be considered in establishing the amount of these intermittent motions will be described hereinafter.

The details of driving means D for actuating the pusher bars will now be considered. A reciprocable pawl bar 36 is provided at one side of the disclosed device and is slidably retained in a pair of bearing blocks 37 which are secured to one side channel 4, as shown in Fig. 1. The pawl bar has a substantially rectangular cross section and has attached to its upper face for part of its length and intermediate its ends a second rectangular bar 38. Thus, for a certain portion of its length, the pawl bar, in conjunction with bar 38, has a substantially T-shaped cross section, a portion of which is shown in Fig. 5. A plurality of pawl units, generally designated 39, are adjustably secured at predetermined intervals along the pawl bar, as shown in Figs. 1 and 2.

The details of construction of each pawl unit are shown in Fig. 5. The pawl unit consists essentially of a pawl block 40 and a clamping block 41 which are disposed on opposite sides of the pawl bar. These blocks have grooves 40a and 41a, respectively, which are adapted to receive bar 38 and facilitate the clamping of the pawl unit thereto. The pawl unit may be attached to bar 38, and hence the pawl bar, by any one of a number of conventional fastening means and has been shown in Fig. 5 as clamped thereto by means of machine screws 42. A groove 43 is provided in a lower portion of pawl block 40. Retained in groove 43 by pivot pin 44 is a pawl finger 45 which has a flat engaging end 46 formed thereon. Pivot pin 44 is secured in pawl block 40 and permits limited swinging movements of the pawl finger. A leaf spring 47 is secured by screws 48 to the upper surface of the pawl block, the leaf spring having an extended lower portion 49 bearing downwardly on the upper surface of a portion of pawl finger 45.

As is shown in Fig. 2, a plurality of these pawl units is secured to the pawl bar and reciprocate therewith. The pawl units are so disposed and spaced with regard to the pusher bars that face 46 of each pawl finger may cooperate on occasion with a pusher bar to impart motion thereto. In the course of the movements of the pawl units towards the left-hand end of the device, the pawl fingers may yield and pass over the top of any pusher bar that may come in contact therewith. On the return motion of the pawl units to the right, one of the pawl fingers will engage a pusher bar, that is in position to be engaged, and the pawl unit will move the bar with a motion corresponding to its own motion.

Shown in Fig. 2 are certain details of the driving members for reciprocating the pawl bar. A pin 50 is provided in a lower portion of the pawl bar and is engaged in a slot 51 of a pivoted actuating lever 52. This pivoted actuating lever is pivotally secured for limited swinging movements on pivot pin 53, carried by the fixed framework of the device. One end of a pivoted connecting link 54 is joined to the lower end of actuating lever 52 by a pivot pin 55. The other end of link 54 is pivotally and adjustably connected by pivot pin 55a to an adjustable crank arm, generally designated 56, which is continuously rotated by drive shaft 57.

As shown in Fig. 3, a drive motor 58 is mounted on a base plate 59 on which is also mounted a number of associated driving units which will be described presently. By means of belt 60, motor 58 drives adjustable pulley 61 of a variable speed unit, generally designated 62. This variable speed unit may be any conventional commercially available type. A belt 63 is also engaged with pulley 61 and drives reduction gear unit 64. The output shaft of the reduction gear unit is the hereinbefore mentioned drive shaft 57. The reduction gear unit may be of any conventional design and for that reason its details will not be described fully herein. However, it may be noted that a worm and worm gear drive has been found to be effective in the present device. A handle 65 may be provided on the variable speed unit. By turning this handle clockwise or counterclockwise, as may be desired, the ratio of driving speeds between the motor and reduction gear unit may be changed at will.

Adjustable crank arm 56 may be made in any conventional manner that permits adjustment of the diameter of swing of pivot pin 55a about drive shaft 57. In the present embodiment, as shown in Fig. 4, pivot pin 55a has been secured to a movable crosshead 66 which is slidably retained in a guide-way 67 formed in the crank arm. The crosshead may be adjusted in position along the guide-way by the rotation of adjusting screw 68. The type of construction used is well known and is believed to be obvious from the drawing.

There are, therefore, generally speaking, two principal adjustments of the driving members for actuating the pawl bar. The first adjustment concerns the speed of operation which may be effected by a suitable adjustment of the variable speed unit 62. The second adjustment controls the throw of the pawl bar and is effected by an adjustment of the crank arm 56, as explained with reference to Fig. 4.

Referring again to Figs. 1 and 2, a conventional conveyor, generally designated 69, is provided at the right-hand end of the present device. The level of the upper stretch of the conveyor belt preferably should be slightly below the level of the upper surface of support table 1, as shown in Fig. 2. The right-hand ends 70 of guide bars 33 preferably should project varying amounts outwardly over the upper stretch of the conveyor belt, substantially as shown in Fig. 1. As the plurality of containers 35 are intermittently advanced towards the right, the terminal container of each of the rows will be pushed onto the surface of the conveyor belt and will be transferred thereby away from the guide bars in a single file procession. A single file of such containers has been shown on the surface of the conveyor belt at 71 in a position such as that which would obtain a short time after the containers are deposited thereon. It may be noted at this point that the varying amount that the guide bars project over the conveyor belt prevents the container deposited on the conveyor belt from any one row from striking or rubbing against the projecting end of the next successive guide bar as the containers are moved along by the conveyor belt. It may be further noted at this point that the longitudinal guide rails 5 are curved and spaced laterally by an increased amount at the right-hand end of the supporting table to provide a sizable air space between consecutive containers on the conveyor. This air space prevents undesirable bumping of the containers against one another.

In operation, containers may be dumped from cartons onto the supporting table in such a way that rows are formed thereon between the guide rails in an alignment similar to that which the containers had when they were in the shipping carton. The spacing of guide rails 5 is adjusted so that each guide rail corresponds to a divider section of the shipping carton as has been described hereinbefore. The containers may be dumped on the supporting table so as to form rows between consecutive pusher bars. If desired, a dumping platform of any conventional type may be used to facilitate this operation. The pusher bars are intermittently moved towards the right, as viewed in Fig. 1, until one of the bars engages the plurality of rows of containers standing on the supporting table. Thereafter, the plurality of rows are simultaneously and intermittently moved towards the right with a motion corresponding to that imparted to the pusher bars and carrier chain by the pawl bar and associated pawl units. It is to be noted that, with drive members of the type disclosed, the intermittent motion will be approximately sinusoidal, the plurality of rows of containers thereby receiving a gradual acceleration and subsequent deceleration in the course of each movement. Each intermittent movement is equal approximately to the distance between corresponding points of any two consecutive containers in any one row. The rows of containers are advanced completely along the length of the supporting table and eventually pass over the upper surface of movable gate 28 and across the upper surface of dead plate 31. As the intermittent movements of the containers are continued, the terminal container of each row is deposited simultaneously on the moving belt of conveyor 69. The rate of travel of the conveyor belt is appropriately adjusted with respect to the speed of operation of the driving means for the pawl bar. In this way, each single file of containers is completely removed from the end of the herein disclosed device before the next succeeding row of containers is deposited thereon.

From this general description, it will be seen that, in an overall sense, the operation of the herein disclosed device is to take a plurality of rows of containers and rearrange them in single file order on the surface of an outgoing conveyor belt.

Many adjustments of various parts of the device may be made, in accordance with the numbers and size of containers being handled and other considerations, in order to adapt the device for efficient use under various service conditions. Some of these adjustments or features, or results thereof, will now be given by way of example and not of limitation.

The distance between consecutive pusher bars is adjusted so that an entire row of containers, as received from the carton, will fit therebetween, with more or less clearance.

The spacing between consecutive pusher bars is uniform. It may be necessary to add links or remove links from the chains to accomplish this equal spacing. Bearing plates 12 have been made adjustable with respect to the frame of the device to permit this adjustment and to take up any slack in the chains.

The amount of motion of the pawl bar from one extreme position to its opposite extreme position is equal or slightly exceeds the distance between corresponding points of consecutive containers in any one row being handled (this distance will be hereinafter referred to as the "diameter" of the containers being handled). This motion may be adjusted by the adjustment of crosshead 66 by screw 68, as has been described with reference to Fig. 4.

The distance between corresponding points of consecutive pawl units equals the "diameter" of containers being handled. The adjustment of the spacing of the pawl units may be accomplished by loosening machine screws 42 and sliding the pawl units as desired with respect to the pawl bar.

The extreme right-hand pawl unit of the plurality of pawl units mounted on the pawl bar is so located that when the pawl bar is in its extreme right-hand position and a pusher bar is in contact with the pawl finger of the extreme right-hand pawl unit, the terminal containers in the plurality of rows adjacent to conveyor belt are approximately tangent to the overhanging edge of the dead plate 31 at the conveyor end of the device. The pusher bar, previously associated with the rows adjacent to the conveyor belt, then will be in a descending position at movable gate 28.

A sufficient number of pawl units are provided on the pawl bar so that after a pusher bar has been moved to the right as far as possible by the extreme right-hand pawl unit, the next successive pusher bar to the left will be in position to be engaged by a pawl unit in the course of the next successive movement of the pawl bar towards the right-hand end of the device.

The width of the dead plate is approximately an even multiple of the "diameter" of the containers being handled. A change of dead plate may be necessary on occasion to meet this requirement.

The herein disclosed device, when adjusted, is inherently capable of compensating for any fractional amount that the consecutive transverse pusher bars are spaced apart in excess of an even multiple of the "diameter" of the containers being handled. Thus, after a pusher bar has been moved as far to the right as possible by the extreme right-hand pawl unit, the next successive pusher bar to the left will be engaged by a pawl unit and will be moved an amount equal to a fraction of a "diameter" of a container, the fractional amount being dependent upon the distance between corresponding points of consecutive pusher bars. In the course of this operation, the left-hand pusher bar may be engaged at about the midpoint of the motion of the pawl bar, and thus suddenly be accelerated. Normally, no adverse result occurs from this. However, should it, under high speed operation with containers of substantial height, so jar the rows of containers immediately in front of the pusher bars that the terminal container of each of the rows may be knocked over, this may be obviated by increasing the spacing between consecutive pawl units slightly. The accumulative effect between the extreme pawl units that come into operative contact with the pusher bars in the course of the operation of the device then will equal the fractional part of the container "diameter" that must be compensated in the spacing of the pusher bars. If such a readjustment and spacing of the pawl units is made, the motion of the pawl bar should be correspondingly increased. The terminal container of each row of containers then may not come to rest on the dead plate exactly tangent to the edge thereof, but instead may be slightly to the left or right of that edge. Although not considered an ideal mode of operation, this is normally not objectionable in view of the fact that the upper surface of the dead plate is slightly above the upper surface of the conveyor belt. It is also unobjectionable because, as has been found in practice, the containers will be properly deposited on the conveyor belt as long as a major portion of the containers being placed thereon passes over the edge of the dead plate.

The device is not restricted to the handling of round bottles or jars but may be used with such extreme shapes as square or rectangular containers. Inasmuch as the containers are handled in a plurality of rows, each row having a relatively small number of containers, containers having vertically inclined sides may be handled without danger of a cumulative tipping effect which normally may tend to tip over such containers when other types of article handling devices are used. It is also to be noted that no large forces are exerted on the containers being handled, the device thereby being admirably suited to the handling of thin-walled ware. An extremely desirable feature of the present device is its universal adaptability to various size cartons having varying numbers of rows of containers. The device may be adapted to the handling of additional rows merely by the addition of more guide rails to the surface of the support table. The present device is also highly advantageous in that, with one setting of the device for containers of a given "diameter," cartons having varying numbers of rows of these containers and/or containers of the same "diameter" but varying heights may be handled without any readjustment being required.

The preferred embodiment of the present invention has been described with particular reference to an outgoing conveyor having a belt which moves normal to the direction of rows of containers on the support table. However, it is within the purview of the present invention to employ a conveyor having a belt moving in a direction parallel to the length of the rows on the support table and in a direction away therefrom. When a conveyor of this type is employed, a series of spaced parallel rows of containers may be formed thereon, the spacing between consecutive rows being dependent on the relative speed of operation of the pawl bar and the outgoing conveyor belt.

The present invention has been disclosed with particular reference to the container field and in the accompanying drawings, jars have been shown as the articles being handled. However, the device is admirably suited to the handling of any article that has a base surface on which the article may be stood and which does not have such an extreme irregularity in its lateral surfaces that the distance between consecutive points on any two adjacent articles in a given row varies greatly.

Having thus described a particular embodiment of my invention and having cited certain of its advantages and details of operation under various conditions, I claim:

1. In an article handling device, a supporting surface for a plurality of articles to be handled, a plurality of spaced pusher members positioned above and spaced from said supporting surface for engaging said articles to move them on said supporting surface, and means to support and intermittently impart predetermined operating movements to said pusher members, said means comprising a guided reciprocable member and a plurality of pawl units adjustably secured to said member at predetermined intervals to engage said pusher members in the course of the reciprocations, and actuating means to reciprocate said guided member.

2. In an article handling device, a supporting surface for a plurality of articles to be handled, endless flexible carrier means operatively positioned in relation to said supporting surface, a plurality of pusher members secured at predetermined intervals to said endless carrier means, said members being spaced from said supporting surface for cooperation with said articles, means to engage said pusher members to intermittently impart thereto predetermined movements, said last named means comprising a guided reciprocable member and a plurality of pawl units adjustably secured to said member at predetermined intervals to engage said pusher members in the course of reciprocations and actuating means to reciprocate said member, and means associated with said supporting surface to receive said articles at the end of their movements along said supporting surface.

3. In a device for rearranging a plurality of rows of containers in a single row, a supporting surface for a plurality of rows of containers to be rearranged, movable endless carrier means, a plurality of members secured at predetermined intervals to said movable carrier means, said members being located transverse to said rows of containers and being spaced from said supporting surface to cooperate with said containers, means to guide said rows of containers as they are moved along said supporting surface by said transverse members to intermittently impart thereto predetermined movements, means to receive and remove the terminal container of each row of containers in the course of said intermittent movements, said means to actuate said transverse members comprising a guided reciprocable member and a plurality of pawls adjustably secured to said member at predetermined intervals to engage said transverse members in the course of the reciprocations, and actuating means to reciprocate said member.

4. Apparatus as defined in claim 3 in which said means to guide said rows of containers comprises spaced longitudinal rails adjustably secured relative to said supporting surface and soft resilient material secured to said longitudinal rails to protect said containers being rearranged.

5. In a device for rearranging a plurality of rows of containers in a single row, a supporting surface for a plurality of rows of containers to be rearranged, movable endless carrier means, a plurality of members secured at predetermined intervals to said movable carrier means, said members being located transverse to said rows of containers and being spaced from said supporting surface to cooperate with said containers, means to guide said rows of containers as they are moved along said supporting surface by said transverse members, means to actuate said transverse members to intermittently impart thereto predetermined movements, means to receive and remove the terminal container of each row of containers in the course of said intermittent movements, said means to actuate and intermittently move said transverse members comprising a pair of fixed bearing blocks, a reciprocable bar supported by said blocks, a plurality of pawl units to engage said transverse members, said pawl units being adjustably secured at predetermined intervals on said bar, and adjustable means to impart to said bar predetermined reciprocating movements.

6. Apparatus as defined in claim 5 in which each of said pawl units comprises a main support block, a clamping block, and a spring loaded pivoted pawl finger.

7. In a device for rearranging a plurality of rows of containers in a single row normal to said plurality of rows, a frame structure, a supporting member fixed to said structure to support said pluralities of articles, a plurality of longitudinal guide rails adjustably secured to said supporting member to guide said plurality of rows of containers, sprockets rotatably secured to said frame, link chains engaged with said sprockets, said chains extending longitudinally at the sides of said supporting member parallel to said rows of containers, a plurality of members secured to said chains at predetermined intervals transverse to and cooperatively spaced with said rows of containers, means to impart predetermined movements to said transverse members in a direction parallel to said rows of containers, a yieldable gate to permit the passage of said transverse members beneath the level of said supporting member, a dead plate mounted transverse to the length of said supporting member at one end thereof, dividing members secured to said dead plate at intervals to register with said rows of containers, and conveyor means parallel and adjacent to and slightly beneath the level of said dead plate to receive the terminal container of each row and transfer said containers away from said plurality of rows in single file order, said means to impart predetermined movements to said transverse members comprising a pair of fixed bearing blocks, a reciprocable bar supported by said blocks, a plurality of pawl units to engage said transverse members, said pawl units adjustably secured at predetermined intervals on said bar, and adjustable means to impart to said bar predetermined reciprocating movements periodically.

ROBERT U. ROURKE.

REFERENCES CITED

The following references are of record in the file of this patent:

UNITED STATES PATENTS

| Number | Name | Date |
|---|---|---|
| 1,092,609 | Taliaferro | Apr. 7, 1914 |
| 1,266,734 | White | May 21, 1918 |
| 1,273,604 | Gallup | July 23, 1918 |
| 1,378,503 | White | May 17, 1921 |
| 1,686,129 | Fullips | Oct. 2, 1928 |
| 1,871,676 | Ermold | Aug. 16, 1932 |
| 1,885,935 | McAllister | Nov. 1, 1932 |
| 2,187,842 | Rheinstrom | Jan. 23, 1940 |
| 2,237,345 | Frentzel et al. | Apr. 8, 1941 |